United States Patent
Batir et al.

(10) Patent No.: US 11,820,249 B2
(45) Date of Patent: Nov. 21, 2023

(54) MANAGING THE CHARGING OF A FLEET OF VEHICLES TO ALIGN WITH A RENEWABLE ENERGY SUPPLY CURVE FOR AN ELECTRIC GRID

(71) Applicant: Bayerische Motoren Werke Aktiengesellschaft, Munich (DE)

(72) Inventors: Sean Batir, San Jose, CA (US); Adam Langton, San Francisco, CA (US); Henry Pease, San Francisco, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/863,288

(22) Filed: Apr. 30, 2020

(65) Prior Publication Data

US 2021/0339647 A1 Nov. 4, 2021

(51) Int. Cl.
*B60L 53/63* (2019.01)
*B60L 53/66* (2019.01)
*B60L 53/62* (2019.01)

(52) U.S. Cl.
CPC .............. *B60L 53/63* (2019.02); *B60L 53/62* (2019.02); *B60L 53/66* (2019.02)

(58) Field of Classification Search
CPC ........... H02J 3/381–386; H02J 2300/20; H02J 2300/22; H02J 2300/24; H02J 2300/26; H02J 2300/28; H02J 2300/40; B60L 53/63; B60L 53/66
See application file for complete search history.

(56) References Cited

U.S. PATENT DOCUMENTS

| | | | |
|---|---|---|---|
| 9,026,347 B2 | 5/2015 | Gadh et al. | |
| 9,436,948 B2 | 9/2016 | Bridges et al. | |
| 2009/0030712 A1 | 1/2009 | Bogolea et al. | |
| 2009/0234599 A1* | 9/2009 | Watanabe | B60L 53/66 702/63 |
| 2011/0001356 A1* | 1/2011 | Pollack | B60L 53/305 307/31 |
| 2011/0109266 A1* | 5/2011 | Rossi | H02J 13/00028 320/109 |
| 2017/0136888 A1* | 5/2017 | Ricci | B60L 5/005 |

* cited by examiner

*Primary Examiner* — David V Henze-Gongola
(74) *Attorney, Agent, or Firm* — Crowell & Moring LLP

(57) ABSTRACT

A computing system can facilitate cooperation between a utility and a fleet of vehicles. The system can receive a charging requirement from a vehicle. The charging requirement can be based on an available power output capacity of a battery pack of the vehicle. The system can receive solar ramp data from a utility. The solar ramp data can be based on an anticipated power output of a solar energy source. The system can determine a charge plan based on the charging requirement and the solar ramp data and specify a timing of charging or discharging the vehicle. The system can transmit the charge plan to the vehicle. The system can receive load data from the vehicle based on supply or consumption of power by the vehicle and the charge plan.

20 Claims, 4 Drawing Sheets

MANAGING THE CHARGING OF A FLEET OF VEHICLES TO ALIGN WITH A RENEWABLE ENERGY SUPPLY CURVE FOR AN ELECTRIC GRID

BACKGROUND

State and local governments have established ambitious targets specifying increased proportions of energy to be generated by renewable sources. Electric grid operators are tasked with ensuring that consumer demand for electrical energy is balanced by supply from the grid. While grid operators can vary the energy output of fuel-based generators to meet demand, the energy output from renewable energy sources are generally time and/or weather-dependent and thus, not easily controlled.

Solar energy is an example of a renewable energy source that presents challenges to balancing the grid both due to its inherent limited duration and weather-based output volatility. Additionally, the ever-increasing adoption of hybrid and electric vehicles has shifted consumer demand for energy from fuel stations to the grid along with creating new patterns of consumption.

BRIEF SUMMARY

According to an embodiment of the disclosed subject matter a computer-implemented method may include receiving, via a network, a charging requirement from a first entity. The charging requirement may be based on an available power output capacity of the first entity. The method may further include receiving, via the network, ramp data from a second entity. The ramp data may be based on an anticipated power output of an energy source. The method may further include determining, via a processor, a charge plan based on the charging requirement and the ramp data. The charge plan may specify a timing of charging or discharging the first entity. The method may further include transmitting, via the network, the charge plan to the first entity. The method may further include receiving, via the network, load data from the first entity. The load data may be based on supply or consumption of power by the first entity and the charge plan. The ramp data may indicate the anticipated power output of a renewable energy source over a plurality of time periods. The second entity may be a vehicle comprising a charge storage device. The charging requirement may indicate a quantity of charge needed to restore the power output capacity to a predetermined level. The predetermined level may be based on an anticipated next use of the vehicle. The charge plan may instruct the first entity to discharge a charge storage device during a time when the ramp data indicates the anticipated power output will be less than a threshold amount. The charge plan may instruct the first entity to defer charging a charge storage device until the ramp data indicates the anticipated power output will meet a threshold amount. The method may further include determining, via the processor, a minimum threshold of charge of the first entity based on the charging requirement. The charge plan may instruct the first entity to charge a charge storage device to the minimum threshold of charge, and after the charge storage device reaches the minimum threshold, to subsequently charge the charge storage device only when the ramp data indicates an anticipated power output will meet a threshold amount. The method may further include receiving, via the network, updated ramp data from the second entity. The method may further include determining, via the processor, an updated charge plan based on the updated ramp data. The method may further include transmitting, via the network, the updated charge plan to the first entity. The method may further include receiving, via the network, second load data from a third entity. The second load data may be based on supply or consumption by the third entity and a second charge plan determined by the processor. The method may further include generating, via the processor, a load profile based on the load data by aggregating the load data with the second load data. The load profile may comprise an aggregate electrical demand or electrical supply of the first entity and the third entity. The method may further include transmitting, via the network, a load profile to the second entity. The charge plan may instruct the first entity to begin charging at a predetermined time and at a variable charging rate. The charging rate may increase when the ramp data indicates an anticipated power output of the energy source will increase or may decrease when the ramp data indicates an anticipated power output of the energy source will decrease.

According to an embodiment of the present subject matter, a system may include a processor, and a memory in communication with the processor. The memory may store a plurality of instructions executable by the processor to cause the system to receive, via a network, a charging requirement from a first entity. The charging requirement may be based on an available power output capacity of the first entity. The memory may further include instructions to cause the processor to receive, via the network, ramp data from a second entity. The ramp data may be based on an anticipated power output of an energy source. The memory may further include instructions to cause the processor to determine, via a processor, a charge plan based on the charging requirement and the ramp data. The charge plan may specify a timing of charging or discharging the first entity. The memory may further include instructions to cause the processor to transmit, via the network, the charge plan to the first entity. The memory may further include instructions to cause the processor to receive, via the network, load data from the first entity. The load data may be based on supply or consumption of power by the first entity and the charge plan. The ramp data may indicate the anticipated power output of a renewable energy source over a plurality of time periods. The second entity may be a vehicle comprising a charge storage device. The charging requirement may indicate a quantity of charge needed to restore the power output capacity to a predetermined level. The predetermined level may be based on an anticipated next use of the vehicle. The charge plan may instruct the first entity to discharge a charge storage device during a time when the ramp data indicates the anticipated power output will be less than a threshold amount. The charge plan may instruct the first entity to defer charging a charge storage device until the ramp data indicates the anticipated power output will meet a threshold amount. The memory may further include instructions to cause the processor to determine, via the processor, a minimum threshold of charge of the first entity based on the charging requirement. The charge plan may instruct the first entity to charge a charge storage device to the minimum threshold of charge, and after the charge storage device reaches the minimum threshold, to subsequently charge the charge storage device only when the ramp data indicates an anticipated power output will meet a threshold amount. The memory may further include instructions to cause the processor to receive, via the network, updated ramp data from the second entity. The memory may further include instructions to cause the processor to determine, via the processor, an updated charge plan based on the updated ramp data. The memory may further include instructions to cause the processor to transmit, via the network, the updated charge plan to the first entity. The memory may further include instructions to cause the processor to receive, via the network, second load data from a third entity. The second load data may be based on supply or consumption by the third entity and a second charge plan determined by the processor. The memory may further include instructions to cause the processor to generate, via the processor, a load profile based on the load data by aggregating the load data with the second load data. The load profile may comprise an aggregate electrical demand or electrical supply of the first entity and the third entity. The memory may further include instructions to cause the processor to transmit, via the network, a load profile to the second entity. The charge plan may instruct the first entity to begin charging at a predetermined time and at a variable charging rate. The charging rate may increase when the ramp data indicates an anticipated power output of the energy source will increase or may decrease when the ramp data indicates an anticipated power output of the energy source will decrease.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
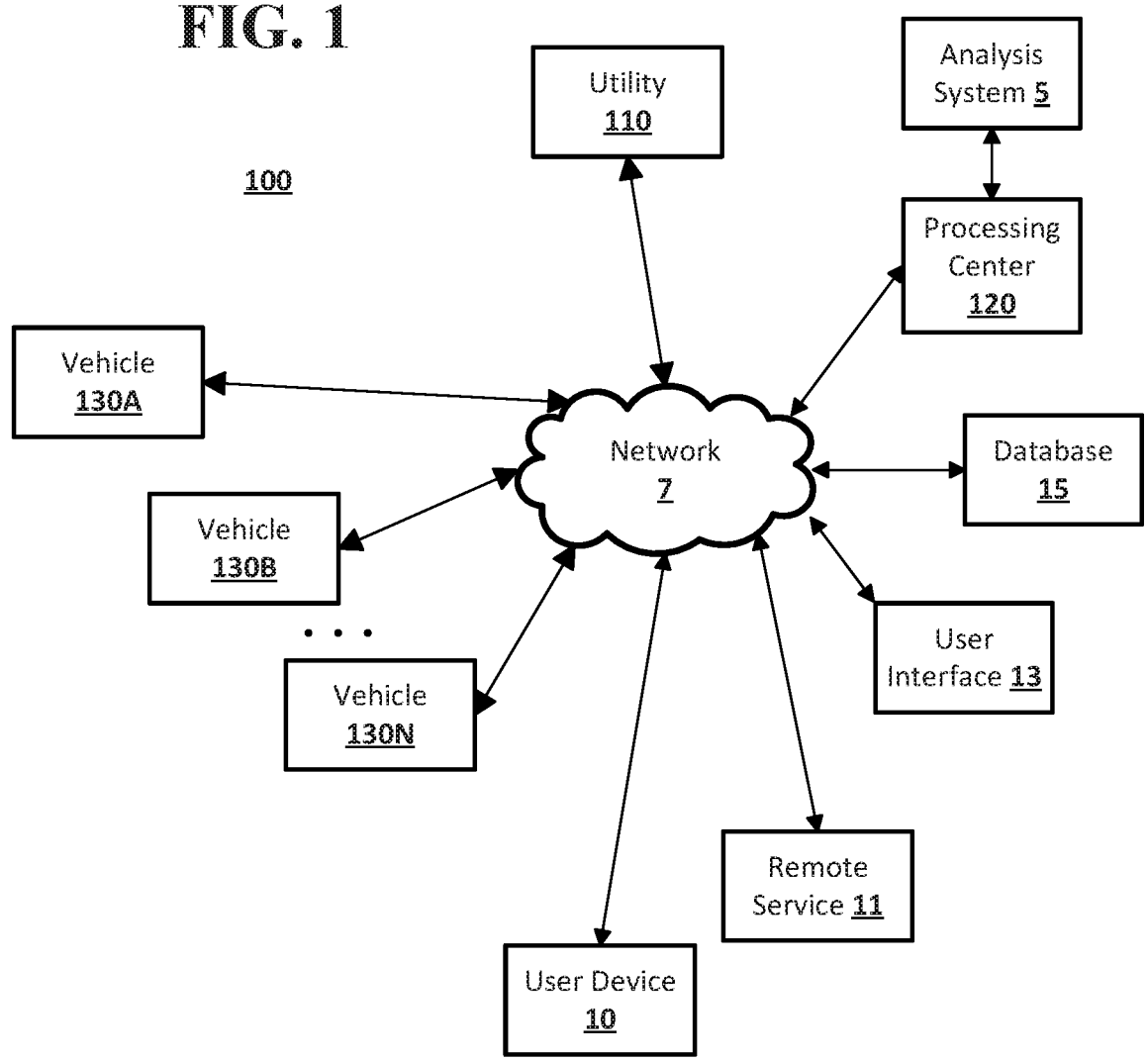
FIG. 1 illustrates an example of network and system configuration according to an embodiment of the disclosed subject matter.

Renewable energy sources may complicate the act of balancing the grid both because of their generally variable output timing and the limited controllability of the output capacity. In the case of solar energy, for example, increasing levels of energy output when the sun rises may necessitate grid operators to find a correspondingly increasing level of demand. Where consumer demand does not coincide with the increasing supply, grid operators may address this issue in a variety of ways. For example, grid operators may direct the surplus solar energy to a stationary energy storage device, such as a battery, which may come with significant costs. Grid operators may curtail solar energy generation by disconnecting or deactivating solar panels, which may be an inefficient use of the solar panel infrastructure. Similarly inefficient, grid operators may artificially create electrical demand by needlessly activating electrical loads where possible. Grid operators may also respond to increased solar output by reducing the output from or completely shutting down fuel-based generators.

In the evening, solar energy begins to decrease as the sun sets, and the grid may be faced with the opposite problem of reducing demand or increasing supply. To balance the grid during this period, grid operators may reduce load, increase output from fuel-based generators, or rely on stored energy sources.

The present subject matter discloses systems and techniques for exchanging information between a consumer electrical device, such as an electric vehicle, a processing center intermediary, and an electric utility. The exchanged information may be used such that each entity may conduct their respective electrical activities in a way that cooperates efficiently with the requirements and constraints of the other. For example, by using the systems and techniques disclosed herein, a grid operator may be better-equipped to forecast consumer electrical demand and to more efficiently manage the harmonization between fuel-based energy generation and renewable energy generation in balancing the grid.

To facilitate understanding of the present subject matter by example, the subsequent discussion will describe an example scenario where one or more plug-in hybrid vehicles or electric vehicles may participate. It should be appreciated that the vehicles are merely example electrical devices and may be substituted with any other electrical device capable of storing a charge, such as portable electronic and computing devices, residential and commercial energy storage devices, power tool equipment, and the like. Similarly, while the following description may use examples referring to solar energy sources, other renewable energy sources may be freely substituted without departing from the scope of the present subject matter. The present subject matter may be particularly advantageous where the renewable energy source supply may vary in an volatile and/or inconsistent, yet recurring or at least somewhat predictable manner.

FIG. 1 shows an example system arrangement 100 according to an embodiment of the disclosed subject matter. One or more electrical devices, such as vehicles 130A-130N, a utility 110, such as an electrical utility, a processing center 120, a database 15, a user interface 13, a remote service 11, as well as other systems, services, and user devices 10, such as local computers, smart phones, tablet computing devices, and the like, may connect to one another via one or more networks 7. Vehicles 130A-130N may include electrical components, such as a battery pack, capacitors, and electric motors, but may also contain other components powered or propelled by alternative energy sources, such as fossil fuels, hydrogen-based fuel cells, nuclear fusion, and the like. The network 7 may be a local network, wide-area network, the Internet, cellular data network, or any other suitable communication network or networks, and may be implemented on any suitable platform including wired and/or wireless networks. The network 7 may facilitate communication amongst some or all of the connected entities. In some cases, the entities 130A-130N and 110, for example, may communicate with a user-facing interface system 13, which may provide access to one or more other systems such as a database 15, a processing center 120, remote service 11, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a vehicle 130A-130N or utility 110.

The user interface 13, database 15, and/or processing center 120 may be part of an integral system, or may include multiple computer systems communicating via a private network, the Internet, or any other suitable network. The processing center 120 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing center 120, database 15, and/or user interface 13. For example, a machine learning system 5 may provide various prediction models, data analysis, or the like to one or more other systems 13, 15, 120.

Figure 2:
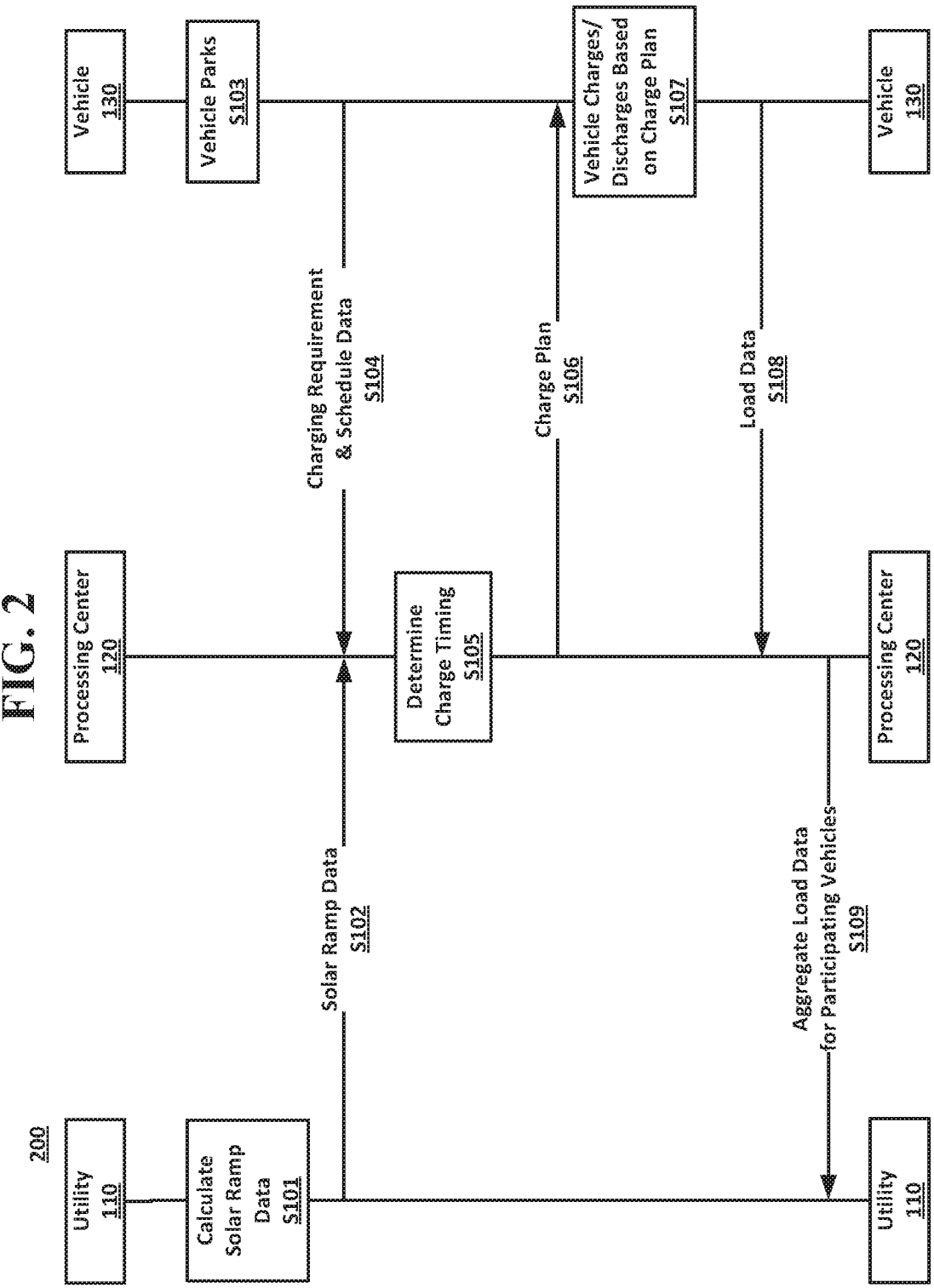
FIG. 2 illustrates a swim-lane diagram for providing a technique to promote cooperation between a utility and a fleet of vehicles according to an embodiment of the disclosed subject matter.

FIG. 2 illustrates a swim-lane diagram for providing a technique 200 to exchange data and align the electrical transactions of a plurality of participating vehicles with the available supply from a utility 110 using a processing center 120 as an intermediary. In an embodiment, a vehicle 130 may be capable of storing an electrical charge. The charge may be stored within vehicle 130 using one or more batteries, capacitors, a combination of both, or in other charge storage devices. Processing center 120 may be implemented using a cloud-based server or other type of computing device or system. Processing center 120 may include, for example, one or more processors, a process space, and an associated storage medium, such as a memory device and/or database 15. Utility 110 may be an electrical utility that may provide electrical power to the one or more vehicles 130 from at least one renewable source, such as solar, and alternatively, or in addition, may provide power from non-renewable sources, such as fossil fuels.

Figure 3:
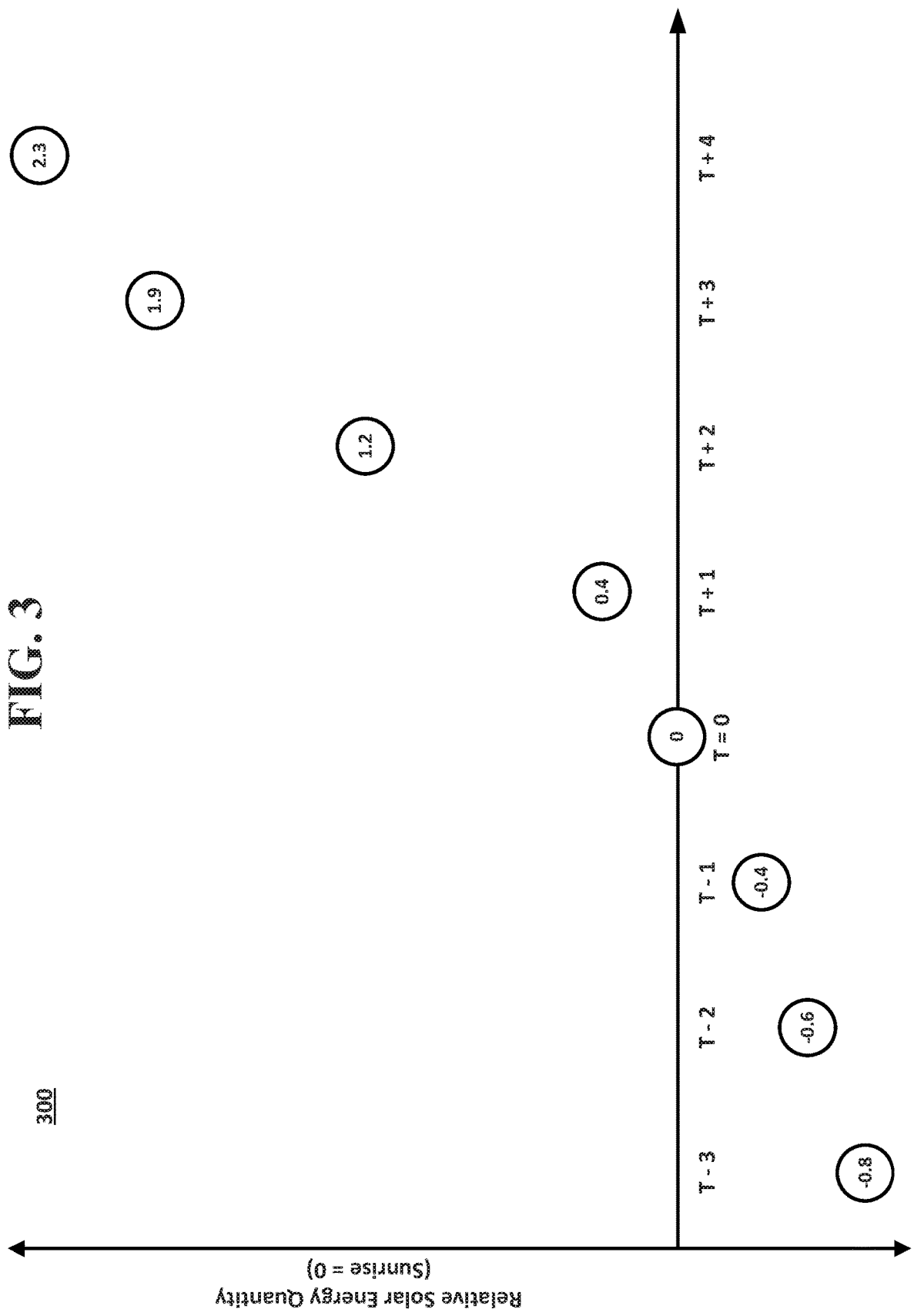
FIG. 3 illustrates an example solar ramp that may inform the charging and discharging of charge storage devices embodied within a fleet of vehicles according to an embodiment of the disclosed subject matter.

As shown in FIG. 2, a utility 110 may calculate solar ramp data in S101. The solar ramp data may specify the amount of power anticipated to be available via solar energy conversion devices throughout the subsequent day or days on a periodic basis (e.g., hourly, minute-by-minute, etc.). The solar ramp data may also indicate the time periods for which the balance of the grid may be best served by supplemental power provided by, for example, charge storage devices. The solar ramp data may specify solar power output for the entire twenty-four hour period or for a subset of a day, such as 3 A.M. to 11 A.M. An example solar ramp 300 is illustrated in FIG. 3. The schedule and power output of the solar ramp may be affected by the operating status and/or availability of solar energy conversion devices, weather, the operating status of the power transmission infrastructure, and the like. For example, the solar ramp data may indicate an amount of power that may be output for a portion of a day, such as less than a twenty-four hour period, less than a twelve-hour period, or the like. Solar energy conversion devices capable of harvesting and converting solar energy may include, for example, photovoltaic devices, solar fuel cells, and the like. The solar ramp data may be transmitted to the processing center 120 in S102 via any suitable communication link, such as via network 7.

At any time before, after, or during which steps S101 and S102 are carried out, a vehicle 130 may be parked in S103. The vehicle 130 may be communicatively coupled via network 7 to processing center 120. In an example, vehicle 130 may be parked to retire it from use until the following day. After being parked, the vehicle 130 may be connected with a charging device to restore the power output capacity of its charge storage device, such as a battery pack. The charging device may be connected to the grid. For the purpose of discussion, the vehicle 130 charge storage device will be referred to as a battery pack, though it should be understood that any charge storage device may be used without departing from the scope of the present subject matter. The vehicle 130 may transmit a charging requirement in S104 to processing center 120. A charging requirement may indicate, for example, a quantity of charge needed to restore the power output capacity of its battery pack to a predetermined level. The predetermined level may be based on an anticipated next use. For example, if the user plans to drive the vehicle 130 for a substantial distance on the subsequent day, the predetermined level may be 100% or otherwise to its maximum storage capacity. If the user plans to drive the vehicle 130 a relatively short distance or to use the vehicle 130 only for non-transportation purposes, the predetermined level may be less than its maximum storage capacity. Alternatively, or in addition, a charging requirement may indicate the current battery pack power output capacity of vehicle 130, which may be determined based on obtaining sensor measurements and/or software-based communications with the battery pack. Alternatively, or in addition, a charging requirement may also indicate whether the user consents to allow discharging of the vehicle 130 battery pack. It may assist with balancing the grid to discharge the battery from vehicle 130 when power provided by renewable energy sources is reduced or unavailable or consumer demand otherwise dictates doing so.

The anticipated next use of the vehicle 130 may be determined based on receiving schedule data or appointment data from a user device 10 or input by the user. For example, the user may transmit his/her daily work schedule from a smartphone or other electronic device to the vehicle 130 such that the vehicle 130 may compute the necessary departure time and/or distance to be traveled of his/her commute. Based on the distance to be traveled, the vehicle 130 may determine an appropriate predetermined level of charge to ensure that fewer stops or no stops at all are needed to recharge the vehicle during the course of the trip. The determination of an appropriate predetermined level of charge may be based on historic energy consumption data of a user and/or the vehicle 130, e.g., an average distance per kilowatt-hour. Additional information may also be provided to the vehicle 130 by the user or a user device 10 to inform computing the predetermined level of charge. For example, the user may provide whether there will be an opportunity to recharge the vehicle at its destination after the morning commute, what type of charging device will be available, the expected duration of the recharging, and whether the user intends to travel on the same or a different route than was used during his/her morning commute. Vehicle 130 may also be capable of generating data based on measurements obtained from one or more sensors located within or nearby the vehicle 130. For example, the current battery pack capacity, battery pack identity, battery pack temperature, the current time, current temperature, other weather data, and an identity and/or input voltage of a charging device to which it may be attached. The predetermined level of charge and vehicle-generated data may be transmitted to processing center 120 during S104.

Alternatively, or in addition, vehicle 130 may provide schedule data in S104 to processing center 120. The schedule data transmitted in S104 may reflect the periods during which the user expects to use the vehicle 130. For privacy reasons, it may be undesirable to transmit all of the user's schedule information. Rather, the user may be provided with the option to select the extent to which his/her anticipated vehicle use is shared with processing center 120. In an example, the user may elect to share only his/her expected morning departure time with processing center 120, which may be transmitted in S104. In another example, the user may elect to share both his/her expected departure time and the expected distance of the trip. Where less information is provided to processing center 120, the processing center 120 may "fill in the gaps" by assuming worse-case scenarios or using default values, such as would prompt charging the battery pack of the vehicle 130 to a greater extent than may be actually needed for the subsequent use or trip.

While only a single vehicle 130 is shown in FIG. 2 for purposes of condensing the discussion, it should be appreciated that a plurality vehicles 130A-130N may equally participate in steps S103, S104, S106, S107, and S108 as shown in technique 200. The steps performed by each of vehicles 130A-130N may or may not occur simultaneously. For example, some or all of vehicles 130A-130N communicably coupled to processing center 120 may transmit the charging requirement and/or schedule data in response to being parked, in response to a polling request from processing center 120, at a predetermined scheduled time, in response to prompting the user, or the like. At some time after receiving both the solar ramp data in S102 and the charging requirement and/or schedule data in S104, the processing center 120 may determine the timing of charging and/or discharging each of the vehicles 130A-130N in S105. As used herein, this is known as the charge timing. The charge timing may be determined in S105 based on one or more of the vehicle 130 charging requirement, the solar ramp data received in S102, schedule data, pricing data, a selected renewable energy mix, a local and/or average regional price of energy, a customer-sourced energy tariff, and any other vehicle-generated data previously discussed, such as the current battery pack capacity, battery pack identity, battery pack temperature, current time, current temperature, other weather data, and identity and/or input voltage of a charging device to which it may be attached.

The determined charge timing may specify whether, when, and at what rate a vehicle 130A-130N should charge and/or discharge its battery pack. The charge timing may instruct the vehicle to begin charging at a predetermined time. In an embodiment, the charging rate may be defined in terms of voltage and/or amperes to be provided to a battery pack. Discharging the charge stored in the battery pack at scheduled intervals may help to balance the grid by supplying energy when renewable energy sources are unavailable or otherwise reduced in output or when consumer demand for electricity simply outweighs supply. The charge timing may be alternatively or additionally based on a threshold charging rate. As previously discussed, the vehicle 130 may obtain one or more of the identity and/or input voltage of an attached charging device, as well as the identity and temperature of a battery pack. A maximum threshold charging and/or a discharging rate may be determined based on any of these factors such that the vehicle 130 battery pack and charging device limitations are not exceeded. The charging and/or discharging rate may also vary according to a schedule. For example, the charge timing generated in S105 may specify charging at a first rate between 6 A.M. and 7 A.M. and a second rate between 7 A.M. and 8 A.M. and may continue to change the charging rate throughout the day. The charge rate may also be specified by the user to charge the battery pack of the vehicle 130 to a minimum threshold as quickly as possible and to reduce the charging rate as the minimum threshold is met. The minimum threshold may also correspond to a level to which the battery may be allowed to discharge. The minimum threshold may correspond to, for example, the level of battery power output capacity necessary to travel a predetermined distance, such as a distance to an emergency destination, a public transportation hub, a place of employment, a relative or friend's home, and the like. The minimum threshold may be specified by the user via a user device 10 or user interface 13, for example.

The charge timing generated in S105 may be alternatively or additionally based on maximizing renewable energy utilization. As previously discussed, renewable energy sources may be used in conjunction with non-renewable energy sources to supply power to the grid. In an embodiment, it may be preferable to generate the charge timing in S105 such that the utilization of renewable energy sources are maximized while minimizing the use of non-renewable energy sources. Where the intent is to maximize the use of solar energy, the charge timing may be set for a vehicle 130 to defer charging until approximately sunrise or until the solar ramp data indicates that solar energy output will meet a minimum threshold. Where it may be unlikely for the vehicle 130 will reach the predetermined level of charge by the time the user plans to use the vehicle, the charge timing may specify beginning to charge the vehicle sooner than sunrise or when the solar energy output meets a minimum threshold, even if solar energy is unavailable or available at low output level. Alternatively, or in addition, where the user employs a minimum threshold as previously discussed, the charge timing generated in S105 may specify to charge the vehicle to reach the minimum threshold as soon as possible using any energy source and then, if solar energy is unavailable, postpone further charging until approximately sunrise.

The charge timing generated in S105 may be alternatively or additionally based on alignment with the solar ramp data, previously described. For example, as shown in FIG. 3, the quantity of relative solar energy may increase following sunrise, for which T=0. In an embodiment, the charging rate of vehicle 130 may be specified to approximately follow the solar ramp where a lower charging rate may be initially specified for lower periods of relative solar energy output (e.g., T=0 to T+2) and gradually increased as the relative solar energy output increases to a maximum (e.g., T+4). Alternatively, or in addition, the charging timing generated in S105 may be such that, for each time T following sunrise, an increasing subset of the plurality of vehicles 130A-130N may be directed to begin charging. For example, with reference to FIG. 3, a first subset of vehicles may be directed to begin charging at T+1, while an additional second subset of vehicles may be directed to begin charging at T+2, while a third additional subset of vehicles may be directed to begin charging at T+3. In this way, the balance of the grid may be improved by scheduling demand (i.e., the vehicles' 130A-130N recharging period) to follow the increasing solar energy quantity, which may reduce reliance on fossil fuel generators and other non-renewable energy sources. While not shown in FIG. 3, a corresponding phenomenon in the opposite direction may be observed in the evening hours where the relative solar energy output begins to decrease until reaching zero at approximately sunset.

Correspondingly, the charge timing generated in S105 may specify the discharge of a battery pack of vehicle 130 such that it follows the negative portion of the solar ramp.

For example and with reference back to FIG. 3, at times T-3, T-2, and T-1, the relative solar energy quantity may be negative. Processing center 120 may specify that the vehicle 130 battery pack be discharged to the grid when the relative solar energy quantity is less than a threshold. These time periods may represent opportunities where discharging the vehicle 130 battery pack may improve the grid balance and reduce the amount of energy generated by non-renewable sources, such as fossil fuel-based generators. As with the prior discussion with respect to charging the vehicles 130A-130N based on the increasing relative solar energy quantity, the discharge rate and number of vehicles 130A-130N discharging their battery packs to the grid may be varied as the need varies. For example, the discharge rate for a vehicle 130 at T-3 may be greater than at T-1 due to reduced demand and/or increasing quantity of relative solar energy based on the solar ramp.

Based on the determined charge timing, an individualized charge plan that implements the charge timing may be transmitted to vehicle 130 in S106. The charge plan transmitted in S106 may be based upon one or more of the charging requirement, the vehicle schedule data, and other vehicle-generated data, as previously discussed. The charge plan may include, for example, one or more of a schedule of when to start and stop the charging of the battery pack of the vehicle 130, a schedule of when the battery pack of the vehicle may be discharged to supply power back to the grid, a charging rate schedule, a discharging rate schedule, and a minimum threshold in which to charge and to which the battery pack may be discharged. In the case where processing center 120 receives the charging requirement and/or schedule data from a vehicle 130A-130N prior to receiving the corresponding solar ramp data in S102 from the utility 110, the processing center 120 may generate a charge plan in S106 based in-part on past historical solar ramp data received from utility 110 and/or generate a prediction of solar ramp data based on available information.

Upon receiving the charge plan transmitted in S106, the vehicle 130 may charge and/or discharge its battery pack, accordingly. Generally, the charge plan received in S106 may determine when and at what rate the vehicle 130 will charge and/or discharge. While carrying out the charge plan, the vehicle 130 may monitor several parameters that characterize the individual vehicle 130 charging load. For example, the vehicle 130 charging load data may be based on the quantity of charge (e.g., kilowatt-hours) consumed during each charging period, the charging rate of the vehicle (e.g., kilowatts), the charging rate of the charging device (e.g., kilowatts), the availability of charge to be delivered back to the grid when renewable power source(s) are unavailable, the quantity of charge, if allowed, delivered back to the grid, the time needed to charge and to discharge, battery pack usage patterns, vehicle identity data, battery identification data, along with relevant vehicle environmental factors, such as the time, date, weather, navigation data, traffic data, autonomous/non-autonomous driving modes, driving behaviors, and the like. For example, the vehicle load data may reflect that users of sports cars traveling on mostly rural roads on sunny Saturdays tend to park the vehicle 130 with a more depleted battery pack than when parked after traveling highways during rainy Mondays. The vehicle load data may also reflect any errors, mismatches, and/or inconsistences between the charge plan and the actual results of the vehicle executing charge plan. As previously discussed, the charge plan may include instructions for the vehicle 130 to begin charging at a predetermined time for a predetermined duration to allow the vehicle battery pack 130 to reach a full charge by the time of the user wishes to begin using the vehicle 130. Should the battery pack not reach a full charge in accordance with the charge plan, the error may be provided in the vehicle load data so as to allow processing center 120 to revise and/or replace the charge plan as needed. For example, processing center 120 may determine that the user of the vehicle 130 frequently deviates from his or her provided departure schedule. In this case, processing center 120 may adjust the charge plan for this user so as to charge the vehicle battery pack more conservatively by beginning charging at an earlier or later time or by modifying the charging rate schedule. Vehicle load data may be transmitted to the processing center 120 in S108.

In an embodiment, the utility 110 may re-calculate (as in S101) and re-transmit the solar ramp data (as in S102) based on the most current information at periodic intervals throughout the day or whenever the solar ramp data has become otherwise stale based on new information. Similarly, the vehicle 130 may re-transmit charging requirement, schedule data, and/or other vehicle-provided data periodically or whenever new information may be received by one or more of the user via the vehicle 130, the user via a user device 10, and the vehicle 130 alone that may warrant changes to the charge plan. Accordingly, the processing center 120 may determine (as in S105) and transmit (as in S106) an updated charge plan periodically or whenever new information may be received from one or more of the utility, the user via a user device 10, the user via the vehicle 130, and the vehicle 130 alone that may warrant changes to the charge plan. For example, the user may have initially provided schedule data indicating a departure time of 8 A.M. and subsequently updated the departure time to 7 A.M., which may necessitate increasing the charging rate to reach the predetermined power output capacity level of the battery pack more quickly. The charging rate may be adjusted by sending a subsequent charge plan to vehicle 130 that replaces all or a portion of the charge plan previously received in S106. Similarly, the utility 110 may have initially calculated the solar ramp data in S101 based on weather forecast information predicting a sunny day, while the actual weather was overcast with clouds, thus decreasing the available solar power output. In response, the processing center 120 may direct the charging device of the vehicle 130 to reduce its charging rate to avoid unbalancing the grid.

Upon receiving the vehicle load data in S108, processing center 120 may leverage the load data in order to make adjustments to the vehicle's 130 charge plan. Alternatively, or in addition, the processing center 120 may aggregate the load data from all of the vehicles 130A-130N with which it communicates to compile an aggregate load profile. The aggregate load profile may include aggregate data characterizing electrical demand imposed by recharging vehicles 130A-130N and the electrical supply provided by vehicles' 130A-130N battery packs while parked, as well as vehicle location data, a charge and discharge datestamp and timestamp, and the like. It should be appreciated that where the user consents, load data may be provided from vehicles 130A-130N even when the vehicle(s) do not otherwise participate in adopting the charge plan. The aggregate load data received from vehicles 130A-130N at processing center 120 may help to forecast the electrical demand and supply of the participating vehicles 130A-130N using predictive algorithms, machine learning techniques, and the like.

The aggregate 130A-130N load data for participating vehicles may be transmitted to the utility 110 from the processing center 120 in S109. Utility 110 may utilize the aggregate load data received in S109 to improve the process of balancing the grid, as previously discussed. For example, by having data reflecting both the demand and supply trends of charge-storing vehicles, the utility may be able to better anticipate the number of fuel-based generators that may need to be operable, the quantity of fuel that may be consumed, whether and/or when additional generation and/or transmission equipment may be needed, and the like.

Embodiments disclosed herein may allow for improving the balancing of the grid by leveraging electrical demand and supply data from a fleet of participating vehicle. By sharing data between the electrical utility and vehicle operators, each entity may adjust its behavior in a way that may reduce reliance on non-renewable energy sources. This is due to the use of the disclosed charging plan that may align the demands of charge-storing vehicles with the volatile but recurring supply of renewable energy, such as solar energy. Additionally, the charging plan may also align periods of surplus electrical energy stored within the fleet of participating vehicles with periods in which the supply of renewable energy sources is low or unavailable. The disclosed subject matter leverages a growing infrastructure of energy storage devices embodied within a fleet of vehicles to make more efficient use of renewable energy sources.

Figure 4:
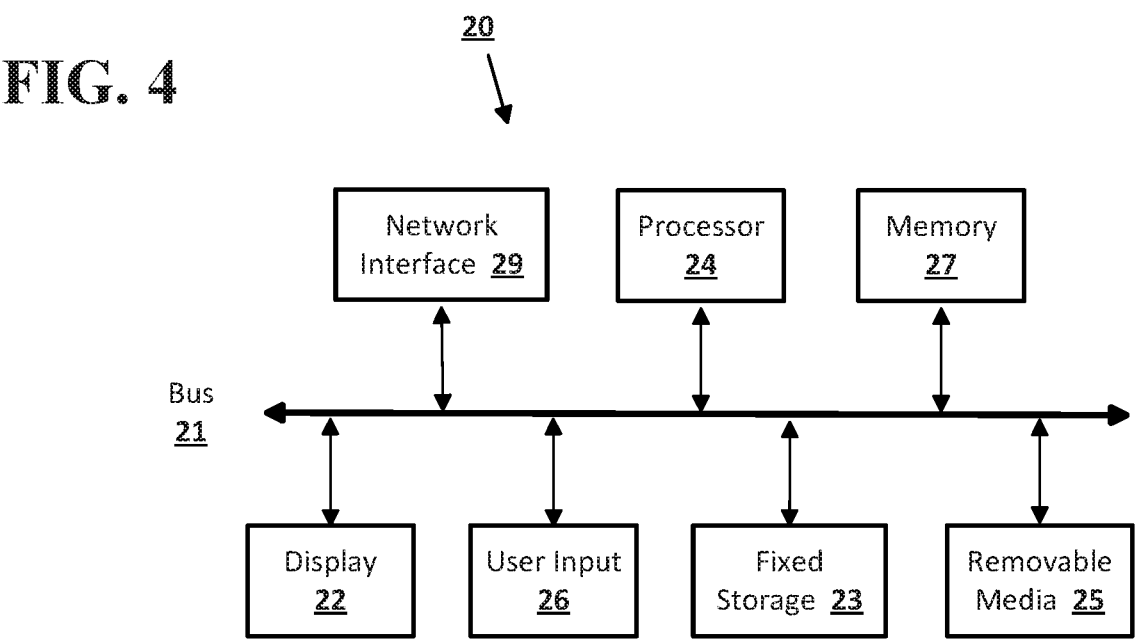
FIG. 4 illustrates a computing device according to an embodiment of the disclosed subject matter.

Embodiments of the presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving, via a network, a charging requirement from a first entity, the charging requirement based on an available power output capacity of the first entity;
   receiving, via the network, ramp data from a second entity, the ramp data based on an anticipated power output of an energy source;
   determining, via a processor, a charge plan based on the charging requirement and the ramp data, the charge plan specifying a timing of charging or discharging the first entity to be executed by the first entity while parked;
   transmitting, via the network, the charge plan to the first entity; and
   receiving, via the network, load data from the first entity, the load data based on historic supply or historic consumption of power by the first entity while the first entity executed the charge plan.

2. The method of claim 1, wherein
   the ramp data indicates the anticipated power output of a renewable energy source over a plurality of time periods.

3. The method of claim 1, wherein
   the first entity is a vehicle comprising a charge storage device that is rechargeable by a charging device of the vehicle according to the charge plan while parked.

4. The method of claim 3, wherein
   the charging requirement indicates a quantity of charge needed to restore the power output capacity to a predetermined level corresponding to a departure time and distance to be traveled during a prospective use of the vehicle.

5. The method of claim 1, wherein
   the charge plan instructs the first entity to discharge a charge storage device, while parked, during a time when the ramp data indicates the anticipated power output will be less than a threshold amount.

6. The method of claim 1, wherein
   the charge plan instructs the first entity to defer charging a charge storage device until the ramp data indicates the anticipated power output will meet a threshold amount based on reaching a predetermined level of charge of the charge storage device by a departure time of the first entity.

7. The method of claim 1, further comprising:
   determining, via the processor, a minimum threshold of charge of the first entity based on the charging requirement, wherein
      the charge plan instructs the first entity to charge a charge storage device, while parked, to the minimum threshold of charge, and after the charge storage device reaches the minimum threshold of charge, to subsequently charge the charge storage device only when the ramp data indicates an anticipated power output will meet a threshold amount.

8. The method of claim 1, wherein
   the load data reflects errors, mismatches, and/or inconsistencies between a planned charge level specified by the charge plan and an actual charge level of a charge storage device that results from the first entity executing the charge plan.

9. The method of claim 1, further comprising:
   receiving, via the network, second load data from a third entity, the second load data based on supply or consumption by the third entity and a second charge plan determined by the processor;
   generating, via the processor, a load profile based on the load data by aggregating the load data with the second load data, the load profile comprising:
      an aggregate electrical demand or electrical supply of the first entity and the third entity, and
      a charge and discharge timestamp for each of the first and third entities; and
   transmitting, via the network, a load profile to the second entity.

10. The method of claim 1, further comprising:
    upon receiving the load data from the first entity, adjusting the charge plan based on the load data; and
    transmitting, via the network, the adjusted charge plan to the first entity.

11. A system comprising:
    a processor;
    a memory in communication with the processor, the memory storing a plurality of instructions executable by the processor to cause the system to:
       receive, via a network, a charging requirement from a first entity, the charging requirement based on an available power output capacity of the first entity;
       receive, via the network, ramp data from a second entity, the ramp data based on an anticipated power output of an energy source;
       determine, via the processor, a charge plan based on the charging requirement and the ramp data, the charge plan specifying a timing of charging or discharging the first entity to be executed by the first entity while parked;
       transmit, via the network, the charge plan to the first entity; and
       receive, via the network, load data from the first entity, the load data based on historic supply or historic consumption by the first entity while the first entity executed the charge plan.

12. The system of claim 11, wherein
    the ramp data indicates the anticipated power output of a renewable energy source over a plurality of time periods.

13. The system of claim 11, wherein
    the first entity is a vehicle comprising a charge storage device that is rechargeable by a charging device of the vehicle according to the charge plan while parked.

14. The system of claim 13, wherein
    the charging requirement indicates a quantity of charge needed to restore the power output capacity to a predetermined level based on receiving an input from a user indicating whether an opportunity exist is recharge the vehicle at its destination.

15. The system of claim 11, wherein
    the charge plan instructs the first entity to discharge a charge storage device, while parked, during a time when the ramp data indicates the anticipated power output will be less than a threshold amount.

16. The system of claim 11, wherein
    the charge plan instructs the first entity to defer charging a charge storage device until the ramp data indicates the anticipated power output will meet a threshold amount based on reaching a predetermined level of charge of the charge storage device by a departure time of the first entity.

17. The system of claim 11, further comprising instructions executable by the processor to cause the system to:
determine, via the processor, a minimum threshold of charge of the first entity based on the charging requirement, wherein
the charge plan instructs the first entity to charge a charge storage device, while parked, to the minimum threshold of charge, and after the charge storage device reaches the minimum threshold, to subsequently charge the charge storage device only when the ramp data indicates an anticipated power output will meet a threshold amount.

18. The system of claim 11, wherein
the load data reflects errors, mismatches, and/or inconsistences between a planned charge level specified by the charge plan and an actual charge level of a charge storage device that results from the first entity executing the charge plan.

19. The system of claim 11, further comprising instructions executable by the processor to cause the system to:
receive, via the network, second load data from a third entity, the second load data based on supply or consumption by the third entity and a second charge plan determined by the processor;
generate, via the processor, a load profile based on the load data by aggregating the load data with the second load data, the load profile comprising:
an aggregate electrical demand or electrical supply of the first entity and the third entity, and
a charge and discharge timestamp for each of the first and third entities; and
transmit, via the network, a load profile to the second entity.

20. The system of claim 11, wherein
the charge plan instructs the first entity to begin charging, while parked, at a predetermined time and at a variable charging rate, the charging rate increasing when the ramp data indicates an anticipated power output of the energy source will increase or decreasing when the ramp data indicates an anticipated power output of the energy source will decrease.

* * * * *